United States Patent [19]
Ducousso et al.

[11] Patent Number: 5,218,687
[45] Date of Patent: Jun. 8, 1993

[54] METHOD AND APPARATUS FOR FAST MEMORY ACCESS IN A COMPUTER SYSTEM

[75] Inventors: Laurent Ducousso, Paris; Philippe Vallet, Lardy, both of France

[73] Assignee: Bull S.A, Paris, France

[21] Appl. No.: 508,931

[22] Filed: Apr. 12, 1990

[30] Foreign Application Priority Data

Apr. 13, 1989 [FR] France .................. 89 04882

[51] Int. Cl.⁵ .................. G06F 12/00; G06F 12/16
[52] U.S. Cl. .................. 395/425; 364/243.41; 364/246.12; 364/DIG. 1
[58] Field of Search .................. 395/425 MS; 364/200 MS File, 900 MS File, 246.11, 246.12, 246.13, 247.3

[56] References Cited

U.S. PATENT DOCUMENTS

| | | | |
|---|---|---|---|
| 3,829,840 | 8/1984 | Burk et al. | 364/200 |
| 4,008,460 | 2/1977 | Bryant et al. | 395/425 |
| 4,181,937 | 1/1980 | Hattori et al. | 395/425 |
| 4,453,230 | 6/1984 | Mizoguchi et al. | 395/400 |
| 4,489,378 | 12/1984 | Dixon et al. | 395/425 |
| 4,490,782 | 12/1984 | Dixon et al. | 364/200 |
| 4,507,729 | 3/1985 | Takahashi et al. | 395/575 |
| 4,571,674 | 2/1986 | Hartung | 395/250 |
| 4,607,331 | 8/1986 | Goodrich, Jr. et al. | 395/425 |
| 4,680,700 | 7/1987 | Hester et al. | 395/400 |
| 4,731,739 | 3/1988 | Woffinden et al. | 395/425 |
| 4,774,659 | 9/1988 | Smith et al. | 364/200 |
| 4,843,542 | 6/1989 | Dashiell et al. | 395/425 |
| 4,914,582 | 4/1990 | Bryg et al. | 395/425 |
| 5,008,813 | 4/1991 | Crane et al. | 395/425 |
| 5,043,885 | 8/1991 | Robinson | 395/425 |

FOREIGN PATENT DOCUMENTS 62-131353 11/1987 Japan.

OTHER PUBLICATIONS

"Minicomputer Blasts Through 4 Million Instructions a Second", W.P. Ward, Electronics International, vol. 55, No. 1, pp. 155-159, Jan. 13, 1982, New York.
"Bringing Virtual Memory to Microsystems", J. Callahan, et al., Electronics International, vol. 54, No. 13, pp. 119-122, Jun. 30, 1981, New York.
"Reference and Change Bit Recording", R. L. Hoffman, et al., IBM Technical Disclosure Bulletin, vol. 23, No. 12, pp. 5516-5519, May 12, 1981, New York.
"Management Technique for Memory Hierarchies", C. M. May, IBM Technical Disclosure Bulletin, vol. 24, No. 1A, pp. 333-335, Jun. 1981, New York.

*Primary Examiner*—Joseph L. Dixon
*Assistant Examiner*—Frank J. Asta
*Attorney, Agent, or Firm*—Weingarten, Schurgin, Gagnebin & Hayes

[57] ABSTRACT

A method and apparatus for fast memory access in a computer system employing a high-speed associative memory for storing extracts that each include an address and an associated information component. Each extract is associated with a presence indicator and a reference indicator, their respective states being changed when an extract is used. According to the method of the invention, the state of each reference indicator can be changed only if the number of extracts present is at least equal to a threshold value. The invention also relates to apparatus for implementing the method. The invention can be applied to cache memories and to translations of virtual addresses to real addresses.

10 Claims, 8 Drawing Sheets

METHOD AND APPARATUS FOR FAST MEMORY ACCESS IN A COMPUTER SYSTEM

FIELD OF THE INVENTION

The invention relates to computers and more particularly to facilitating access to information contained in a memory system of a computer.

BACKGROUND OF THE INVENTION

The central subsystem of a computer generally comprises three types of units: processors, memory modules forming the main memory, and input-output controllers. Usually the processors communicate with the memory modules through a bus that allows addressing and transfer of data between the processors and the main memory. To execute a program instruction, its operands must be located in the main memory. The same is true for successive instructions of the program to be executed. In the case of a multiprocessing system, the memory must be partitioned to allow multiplexing between programs. For this purpose, virtual addressing is generally used in conjunction with a pagination mechanism which includes dividing the addressable space, or "virtual space," into zones of a fixed size called "pages." In a system of this kind, a program being executed addresses a virtual space that corresponds to a real portion of the main memory. Thus, a logical or virtual address is associated with a physical or real address of the main memory.

An instruction that requires addressing contains information that enables the processor executing it to obtain a real address. In general, this virtual address is segmented, i.e., it is composed of a segment number, a page number, and a shift i.e., displacement within the referenced page. The segment number in turn can be subdivided into a segment table number and a shift within this table.

In order to access an item of information in memory associated with this segmented address, several memory accesses are necessary. It is first necessary to access an address space table allocated to the process (program being executed). From this table, using a segment table number, the real address of the corresponding segment table is then obtained. Next, as a function of the shift in the segment table, a segment descriptor is accessed which makes it possible to calculate the real address of a page table. Eventually a real page address is found, using a function of the page number defining the shift within this page table, thereby making it possible to address the memory. The real address of a word or particular byte [8-bit byte] is obtained by concatenation of the real page address with the shift within this page defined by the least significant bits of the virtual address.

A memory access is relatively time consuming, due primarily to the use of a bus that is common to both the processors and the memory module. To improve system performance, the successive memory accesses typically required to obtain a real address are avoided as much as possible. Most processes have a locality property according to which, during a given phase of its execution, the number of pages used by a process is very small relative to the total number of pages allocated to that process.

The locality property can be used to facilitate the translation of a virtual address into a real address by the use of "extracts". Each extract includes a virtual address and an associated real address, and is used by the program during a single execution phase. A plurality of extracts are stored in high-speed memory or in registers. To perform a translation of a virtual address into a real address, a high-speed associative memory is accessed to determine whether the virtual address to be translated is already present in the high-speed memory. If it is, the real address is obtained directly without accessing the main memory.

The locality property motivates the use of cache memories composed of small, high-speed memories in which the pages most recently referenced are stored. The probability that a new reference will relate to an item of information already present in cache memory is high, so the effective access time is reduced. In a manner analogous to the translation of the virtual address into a real address, a cache memory comprises a table containing the real addresses of the pages present in the cache memory. This table, called a directory, can be consulted in an associative fashion to determine whether the information associated with a given real address is contained in the cache memory. If it is, a word or byte is obtained by addressing the cache memory by means of the least significant bits of the virtual address of the word or octet.

Issues related to the translation of addresses will now be discussed, it being understood that the same considerations may apply to cache memories. In both cases, the issue is that of rapidly obtaining information associated with a page address. In the case of translation of an address, the page address is a virtual address and the associated information is the corresponding real address, while in the case of cache memory, the page address is a real address and the associated information includes all the data contained in the page.

As previously discussed, the high-speed translation memory is an associative memory. The memory comprises a given number of registers, or more generally, locations, each capable of storing one extract. Each extract can be accompanied by additional information such as right-of-access indicators or indicators reporting that a write access has been effected in the page associated with the extract. Moreover, each extract is associated with a presence indicator which, for a given logic state, indicates that the associated extract is valid. These presence indicators are, for example, set to zero at initialization, i.e., each time a process is activated in a particular processor. Thus, as the process uses new pages, the associated extracts are loaded into associative memory and the respective presence indicators are simultaneously set to 1. When a memory access must be executed, the virtual address is compared with the virtual address of each extract stored in associative memory. If there is a match between the virtual address being sought and one of the virtual addresses of an extract stored in the memory while its associated presence indicator is set to 1, the corresponding real address can be obtained directly by simply reading the register that contains the real address.

In order for this translation mechanism to be practical, the associative memory must be of limited size. Consequently, for processes with many pages, the associative memory cannot store all the extracts corresponding to these pages. When associative memory is full, the only way to store a new extract therein is to erase an old extract. It is therefore necessary to provide a method for eradicating an old extract and storing a new extract in its place. To accomplish this, a replacement algorithm is used that decides which old extract is to be replaced by a new extract. Many algorithms have already been proposed, for example:

- the FIFO ("first in, first out") algorithm, in which the oldest extract is replaced;
- the RAND ("random choice") algorithm, in which the extract to be replaced is chosen at random;
- the LFU ("least frequently used") algorithm, in which the least frequently used extract is replaced; and
- the LRU ("least recently used") algorithm, in which the least recently used extract is replaced. The LRU algorithm theoretically gives good results, but in practice it is preferable to use a simplified version, called the "pseudo-LRU." To generate n extracts, a true LRU requires the presence and management of $\log_2(n)$ bits per extract to maintain an ordered history of the uses of the extracts. On the other hand, a pseudo-LRU requires only a single bit per extract, called a reference bit or indicator.

According to the pseudo-LRU algorithm, the reference bit is set to a first logic state (1 for example) when its associated extract is used. When the associative memory is full, all the presence indicators are set to 1, and a new extract must be loaded. The extract to be replaced is the first extract encountered with a reference bit set to 0 according to the chronological order of filling. When saturation is reached, i.e., when all but one of the reference bits are set at 1, the extract whose reference bit is at 0 is replaced by the new extract, and all the reference bits are then reset to 0. Resetting all the reference bits obliterates the history of the use of the extracts.

The loss of the history upon saturation results in a decrease in the efficiency of the algorithm. Moreover, a freshly loaded extract may very likely be reused immediately after being loaded, again resulting in saturation upon the loading of the fresh extract.

To assess the consequences of this loss of history, it is useful to perform simulations of populations consisting of specific processes relating to applications normally handled by the system. It is found, for example, that for a certain population of processes, in 65% of the cases, only 32 extracts are required. This means that 65% of the processes do not require use of the replacement algorithm. On the contrary; the algorithm will be used at least once by 35% of the processes. This means that a loss of history will occur at least once in 35% of the cases.

During a simulation, it has also been found in 90% of the cases, that at a given moment, a program will access one of the last seven extracts called. This result confirms the phenomenon of locality mentioned above. Thus, after the reference bits are reset to 0 after saturation, the only criterion for selecting the extract to be replaced is the position of the extract in the associative memory. However, the location of an extract provides no indication of the time of its last use; it only provides an indication of its first use. Thus, it is quite possible that pages used at the start of the process will be used again a short time before saturation. In this case, after resetting the reference bits to 0, these pages will be eliminated first, even though they have a high probability of being reused very soon thereafter.

SUMMARY OF THE INVENTION

One aspect of the invention is a method for rapid access to information stored in the main memory of a computer system, a component of information being located by an address, that component of information and its associated address together being called an "extract". The system includes a high-speed associative memory that includes a plurality of memory locations, each location being capable of storing one extract. Each extract is associated with a presence indicator and a reference indicator initialized to a first logic state, the presence indicator assuming a second logic state when the corresponding extract is present in the high-speed memory. Access to an item of information is accomplished by associatively searching for the extract present in the high-speed memory whose address matches the address of the information sought. The reference indicators undergo a change of state upon use of their respective extracts, the state change being detected and processed by an algorithm for replacing old extracts with new extracts that are being sought and are not yet present in the high-speed memory. The reference indicators are maintained at their initial logic state while the number of extracts present in the high-speed memory is less than a given threshold value. A reference indicator is forced to a second logic state when the associated extract is used, but only if the number of extracts present is at least equal to said threshold value.

Provision is made for the reference indicators to be maintained at their initial states (for example at 0) during the early stages of execution of a process, and for as long as the number of extracts present remains less than a given threshold value. Once the threshold value has been reached, updating the reference indicators takes place normally. Thus, when the associative memory is full, only the extracts used during an execution phase corresponding to the end of filling can have their reference indicators set to a logic state (1 for example) that indicates their use. As a result, on average, a larger number of processes will escape the loss of history due to saturation.

The threshold value is chosen so that the difference between the number of extracts and the number n of locations in the high-speed memory results in a history of sufficient scope to optimize the performance of an intended application.

According to one preferred embodiment of the process of the invention, a rank is assigned to each location in the high-speed memory. Extracts are initially loaded in chronological order into locations of increasing rank. The state of the presence indicator whose rank is equal to the threshold value provides an indication that the threshold value has been reached.

In another aspect of the process of the invention, when an information item being sought cannot be found in the high-speed memory, the information is then sought in the main memory and the corresponding extract is loaded into the high-speed memory at a location whose rank is determined by the loading algorithm. The associated presence indicator is forced to a second logic state in conjunction with the loading. A new associative search for the desired information is then performed.

According to yet another aspect of the process of the invention, the loading algorithm includes the steps of searching, in increasing order, the rank of the first extract whose presence indicator is at a first logic state or, failing that, of the first extract whose reference indicator is at the first logic state.

A further aspect of the invention is an apparatus for implementing the process of the invention. The apparatus includes processing means for accessing "extracts" that each include an address and an associated information component. An extract is accessed by addressing a main memory included in the apparatus. The processing means also includes a high-speed associative memory that has a plurality of locations, each location being capable of storing an extract. Each location is associated with a presence flip-flop and a reference flip-flop, each being initially set to a first logic state. The presence flip-flop is placed at a second logic state when an extract is loaded into the associated location. The high-speed memory cooperates with a comparison means that delivers, for each location, a coincidence signal having a first logic value when the address of an item of sought information coincides with the address of an extract present in the location. The apparatus also includes threshold detection means for furnishing a threshold signal whose logic value indicates whether the number of extracts present in said high-speed memory is at least equal to a given threshold value. For each extract that is present, the state of the associated reference flip-flop is controlled by a management circuit for forcing the reference flip-flop to a second logic state when the coincidence signal indicates a match while the threshold signal indicates that the threshold has been reached.

DESCRIPTION OF THE DRAWINGS

The invention will be more fully understood from the following detailed description, in conjunction with the accompanying drawings, in which.

DETAILED DESCRIPTION OF THE INVENTION

Figure 1:
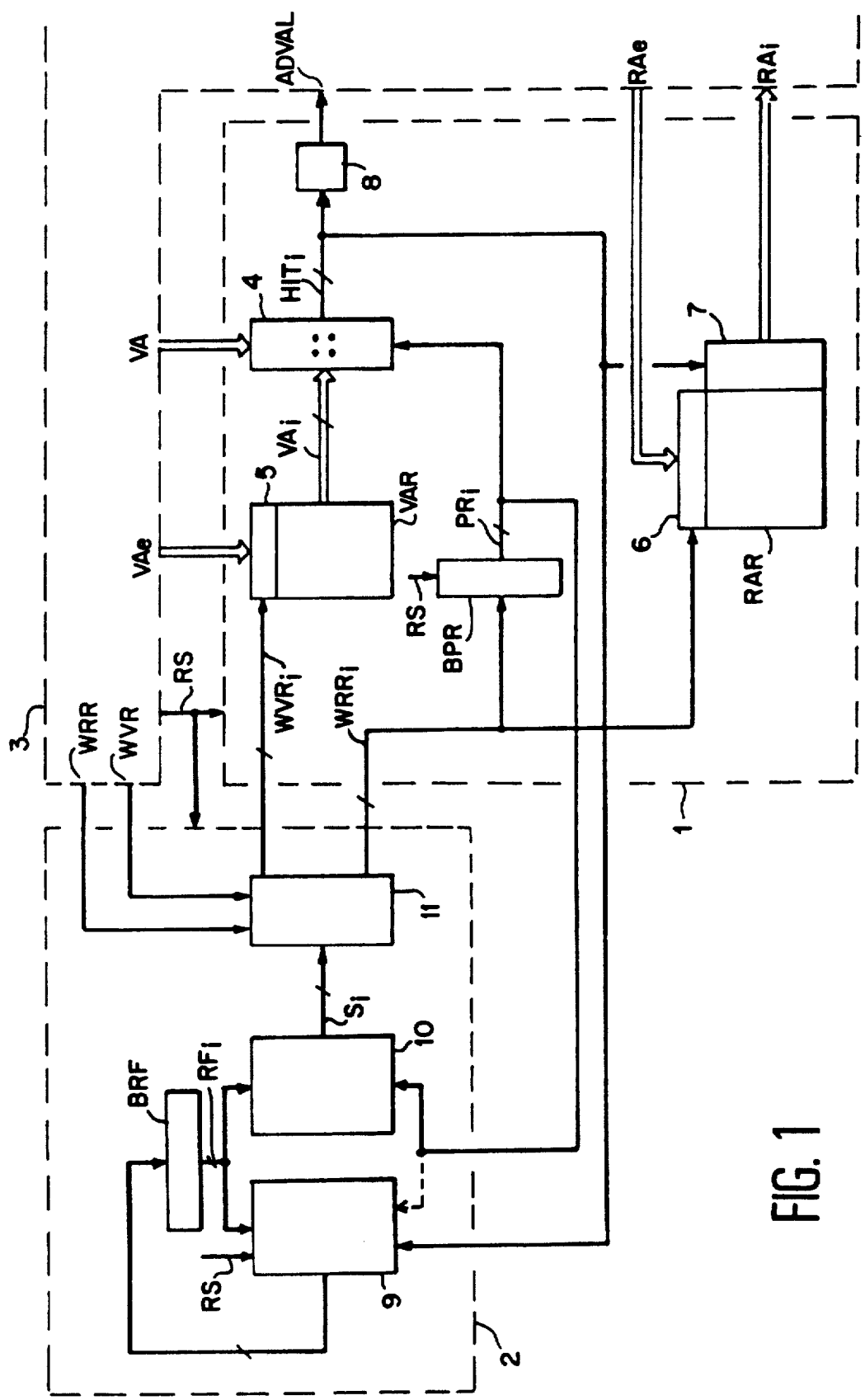
FIG. 1 is a block diagram of the processing means of a computer system that incorporates the invention.

With reference to FIG. 1, a high-speed associative memory 1 is connected so as to communicate with a controller 2 and with a portion of the circuitry 3 of a processor. In traditional fashion, the processor and its circuitry 3 is connected to the main memory (not shown). In particular, the circuitry 3 is a portion of the processor that relates to address translation, and includes an address development unit, generally microprogrammed for calculating the virtual addresses VA of the information sought. The firmware that controls the circuitry 3 executes searches in translation tables to obtain the real addresses as a function of the virtual addresses. This address translation is speeded up by the associative memory that includes a number n of virtual address registers VAR and the same number of real address registers RAR. The associative memory 1 also has a set of n flip-flops BPR associated respectively with the virtual address registers and real address registers. The combination of a virtual address $VA_i$ contained in the virtual address register with rank i and a real address $RA_i$ contained in the real address register of the same rank, constitutes an extract i. This extract i is associated with a presence indicator $PR_i$ whose logic state corresponds to the state of the corresponding presence flip-flop. A comparator 4 is connected to outputs $VA_i$ of virtual address registers VAR and receives from the firmware of circuitry 3 the virtual address VA to be translated. Comparison circuit 4 is validated by output signals $PR_i$ from the presence flip-flops BPR. Circuit 4 provides coincidence signals $HIT_i$ whose logic values represent equality between the virtual address sought and one of the virtual addresses contained in registers VAR. The $HIT_i$ signals are provided to a validation circuit 8 that furnishes an address validation signal ADVAL to the firmware of circuitry 3, indicating whether address translation was successful.

In the event of a failure, the ADVAL signal initiates a micro-program that searches within the tables for the real address. Once a search has been done, the virtual address $VA_e$ and its associated real address $RA_e$ are applied respectively to input interfaces 5, 6 of the virtual and real address registers. The virtual and real addresses are then written in one of these registers under the control of write command signals $WVR_i$ and $WRR_i$, respectively. If translation is successful, coincidence signals $HIT_i$ authorize, via interface 7, reading of the real address register containing the translation sought.

Controller 2 comprises a set of reference flip-flops BRF associated respectively with the locations of memory 1, and with the extracts stored within those locations. The state $RF_i$ of the flip-flops BRF is determined by a control circuit 9 which receives coincidence signals $HIT_i$ and which is connected to the outputs $RF_i$ of the reference flip-flops BRF. A selection circuit 10 connected to the outputs of presence flip-flop BPR and the reference flip-flops BRF delivers selection signals $S_i$ which are applied to a load control circuit 11 that delivers the above-mentioned $WVR_i$ and $WRR_i$ signals. Selection signals $S_i$ determine the virtual and real address registers into which a new extract not present in the table must be loaded. The write commands $WVR_i$ and $WRR_i$ are determined by the load control circuit 11 as a function of the selection signals $S_i$ and common write command signals WRR, WVR that are delivered by the circuitry 3 under control of firmware. The firmware controlling the circuitry 3 also furnishes a signal RS that controls the resetting of the presence and reference flip-flops.

The device in FIG. 1 operates as follows. When a virtual address VA is to be translated, the microsoftware controlling the circuitry 3 places the virtual address at the input of the comparator 4. In the event of a match, the $HIT_i$ signals validate the real address register containing the translation sought and circuit 8 validates this address by the ADVAL signal. Control circuit 9 reupdates the state of the latter flip-flops as a function of the coincidence signals $HIT_i$, the number of extracts present in the high-speed memory, and the previous state $RF_i$ of the reference flip-flops. Selection circuit 10 reupdates selection signals $S_i$ according to the new state $RF_i$ of these flip-flops and the presence indicators $PR_i$, to determine which new registers will receive the next extract.

In the event of a translation failure, the ADVAL signal triggers the microprogram that searches in the tables. Once the search has been executed, the corresponding extract $VA_e$, $RA_e$ is presented to the inputs of interfaces 5, 6. Control circuit 11 then locates the extract according to the write signals WRR, WVR and selection signals $S_i$. Once the extract has been loaded into the selected registers, the microsoftware controlling the circuitry 3 makes a new attempt to translate the virtual address to be translated.

According to one feature of this embodiment, control circuit 9 takes into account the number of extracts present in the memory. As long as this number is less than a given threshold value t, reference indicators $RF_i$ are kept unchanged and thus preserve the initial state (e.g., 0) which was imposed on them by the RS signal at the beginning of the process, for example, after a dispatch. As soon as the number of extracts present reaches or exceeds the value t, indicators $R_i$ can be modified according to the classical pseudo-LRU algorithm. It will be shown below how this threshold can be detected in practice.

The value of the threshold is determined by searching for the optimum value of the number n-t which corresponds to the number of extracts loaded between the time the threshold is reached and the time when the associative memory is full. To accomplish this, use can be made of statistical data relating to, in particular, the number of extracts used by the processes between two dispatches and the age of the reused pages. Another solution consists of making system operation simulations with characteristic programs, varying the value of the threshold.

As a non-limiting example, for a universal computer of the multiprocessor type with n=32, t may be chosen to equal 24.

Figure 2:
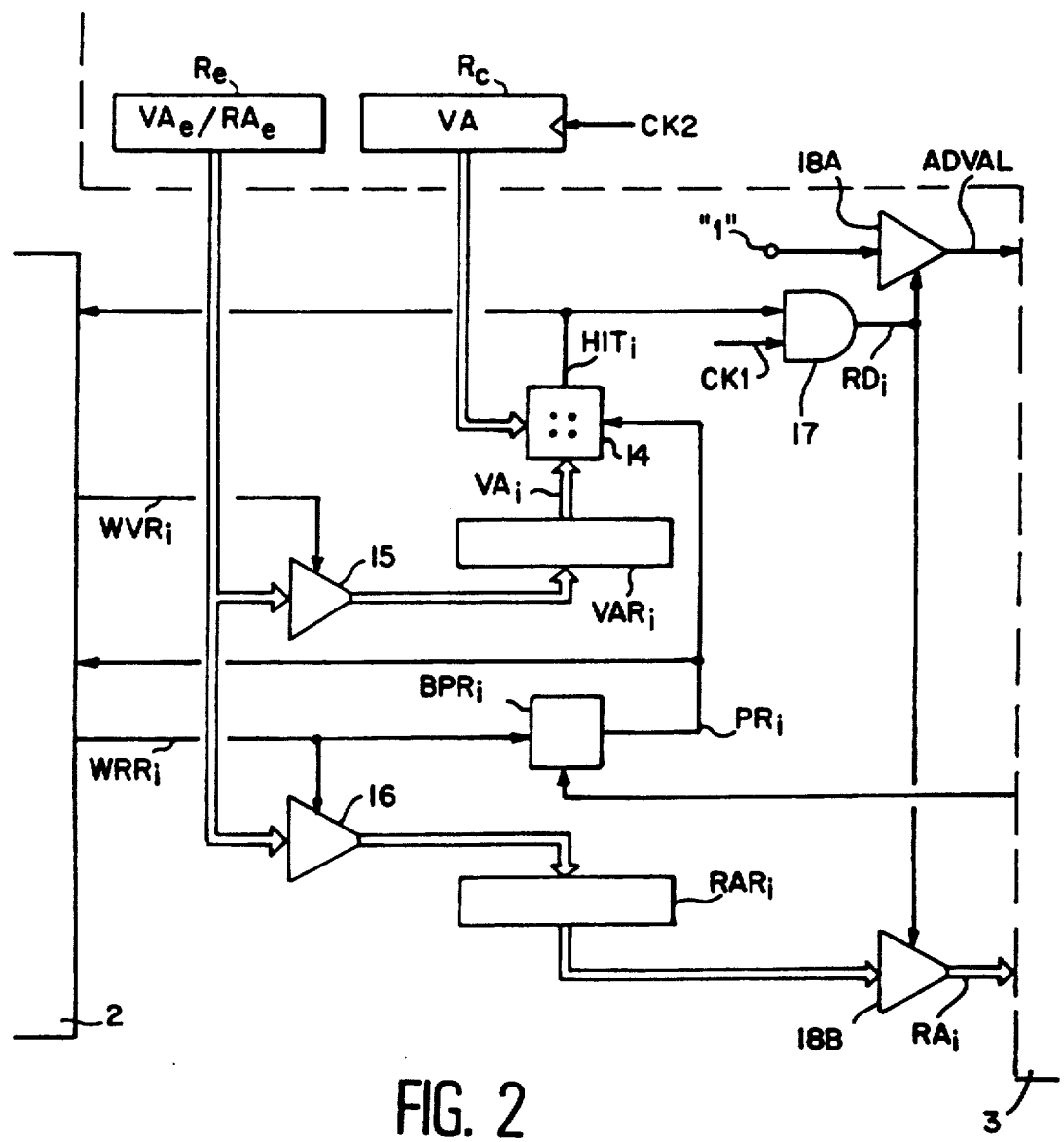
FIG. 2 is a schematic diagram of an embodiment of the high-speed associative memory.

FIG. 2 shows the part of memory 1 associated with one of the extracts. The virtual and real addresses of an extract i assumed to be loaded are contained in virtual address register $VAR_i$ and real address register $RAR_i$, respectively. The parallel output $VA_i$ of virtual address register $VAR_i$ is connected to a first input of a comparison circuit 14 of comparator 4 whose second input receives the virtual address to be translated VA that is furnished by register $R_c$. A presence flip-flop $BPR_i$ is connected at its output $PR_i$ to the validation input of circuit 14. Output $PR_i$ is also connected to controller 2. The output of circuit 14 is connected to the controller 2 to the input of a synchronization gate 17. Gate 17 is synchronized by the first phase CK1 of a clock signal.

The parallel output of real address register $RAR_i$ is connected to the input of an amplifier 18B validated by output signal $RD_i$ from synchronization gate 17. Signal $RD_i$ also validates amplifier 18A which receives at its input a voltage corresponding to logic value 1. The signals ADVAL and $RA_i$ from amplifiers 18A and 18B are sent to the firmware controlling circuitry 3.

The virtual and real addresses $VA_e$ and $RA_e$ that are to be loaded into the registers are initially placed in an output register $R_e$ of the firmware. The parallel output of register $R_e$ is connected to the parallel inputs of register $VAR_i$ and $RAR_i$ via amplifiers 15 and 16, respectively. Amplifiers 15 and 16 are validated respectively by signals $WVR_i$ and $WRR_i$ furnished by controller 2.

The circuit of FIG. 2 operates as follows. A clock (not shown) furnishes a clock signal with two phases CK1 and CK2. During phase CK2, the firmware of circuitry 3 places the virtual address to be translated VA in register $R_c$. During the next phase CK1, this address is compared in circuit 15 to the virtual address $VA_i$ contained in register $VAR_i$. If addresses VA and $VA_i$ are different, or if presence indicator $PR_i$ is at 0, coincidence signal $HIT_i$ will assume a value of 0. As a result, during phase CK1 amplifiers 18A and 18B are maintained in a state of high impedance.

If, on the other hand, addresses VA and $VA_i$ are identical while presence indicator $PR_i$ is at 1, coincidence signal $HIT_i$ assumes a value of 1. Thus, during phase CK1, real address $RA_i$ contained in register $RAR_i$ is transmitted to the firmware of circuitry 3 by means of amplifier 18B. Simultaneously, the ADVAL signal is at 1, thus indicating the success of translation. Note that amplifiers 18A associated with the various memory extracts execute a wired OR function that can advantageously be accomplished by means of a precharged line during phase CK2 and selectively unloaded by one of the signals $RD_i$ during phase CK1.

To load a new extract into the high-speed memory, the microsoftware of circuitry 3 first places the virtual address $VA_e$ of the extract in register $R_e$ and activates the virtual address write control signal WVR of FIG. 1. If register $VAR_i$ is selected, loading circuit 11 of controller 2 furnishes a $WVR_i$ signal which validates amplifier 15. Likewise, the corresponding real address $RA_e$ is then placed in output register $R_e$ and the $WRR_i$ signal validates amplifier 16.

Figure 3:
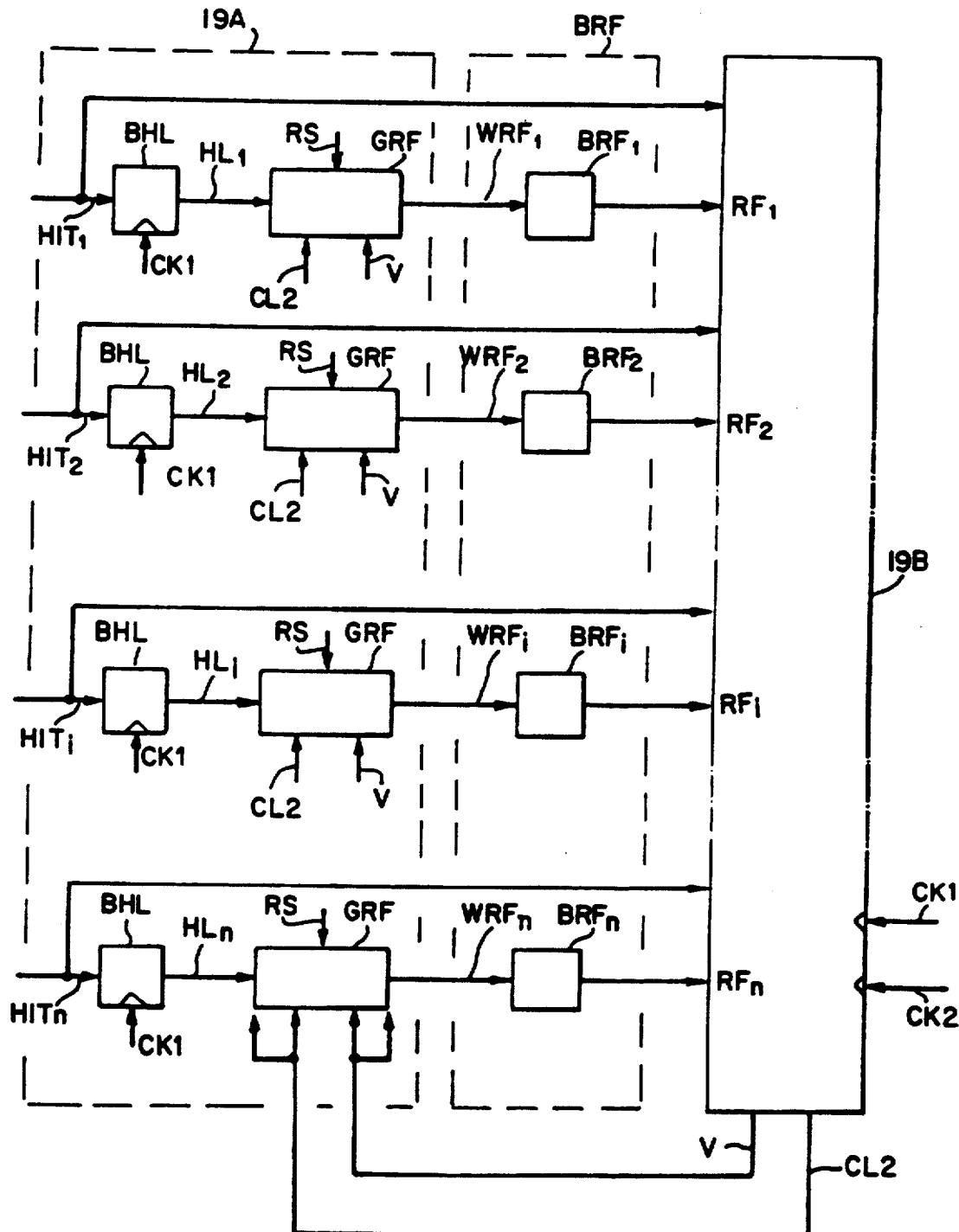
FIG. 3 is a schematic diagram of a control circuit of the reference indicators.

FIG. 3 shows reference flip-flops BRF and their control circuit 9 in greater detail. Control circuit 9 is composed of a common control circuit 19B and an assembly of flip-flop BRF management circuits 19A. With the locations (pairs of registers) of the associative memory being referenced by the subscripts 1, 2, ..., i, ..., n, they are associated respectively with flip-flops $BRF_1$, $BRF_2$, ..., $BRF_i$, ..., $BRF_n$. Each flip-flop $BRF_i$ is controlled by a signal $WRF_i$ furnished by an associated management circuit GRF. Outputs $RF_1$, $RF_2$, ..., $RF_i$, ..., $RF_n$ are connected to common control circuit 19B which furnishes to each management circuit GRF a prepositioning signal V for setting to 1 and a prepositioning signal CL2 for setting to 0. Circuit 19B also receives coincidence signals $HIT_1$, $HIT_2$, ..., $HIT_i$, ..., $HIT_n$. Each management circuit GRF receives a signal $HL_i$ which is the coincidence signal $HIT_i$ latched by a flip-flop BHL upon each phase CK1.

Figure 4:
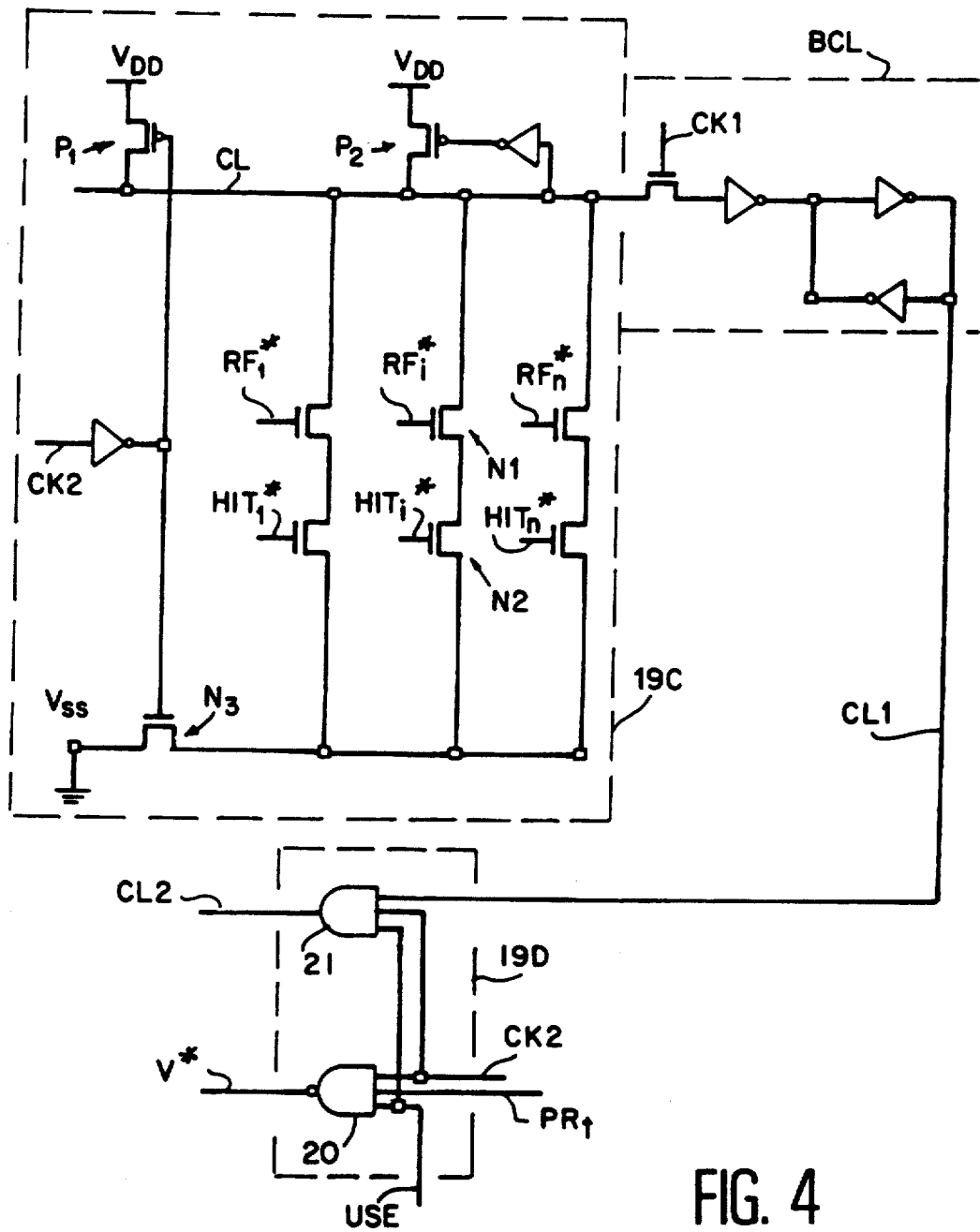
FIG. 4 is a schematic diagram of an implementation detail of the control circuit of FIG. 3.

The operation of the circuit in FIG. 3 will be explained with the reference to FIGS. 4 and 5 which represent detailed forms of common control circuit 19B and management circuit GRF, respectively. By convention, the explanations will be given in positive logic. Common control circuit 19B of FIG. 3 includes an evaluation circuit 19C, a flip-flop BCL, and a synchronization circuit 19D. Evaluation circuit 19C has an evaluation line CL whose state indicates whether the saturation condition of the high-speed memory has been reached. Circuit 19C consists of a complex logic gate in CMOS technology whose line CL is precharged during phase CK2 by means of PMOS transistors P1 and P2. Line CL is evalutated as a function of signals $HIT_i^*$ and $RF_i^*$, respectively, which are the complements of the coincidence signal $HIT_i$ and the reference signal $RF_i$ associated with the extracts contained in the high-speed memory. The state of line CL is latched by the flip-flop BCL upon phase CK1. The flip-flop BCL then provides a latched evaluation signal CL1 at its output.

Line CL is connected to ground VSS via a common NMOS transistor N3 and, for each extract, via the series arrangement including two NMOS transistors N1 and N2 whose gates receive respectively the signals $RF_i^*$ and $HIT_i^*$ from the associated extract. This arrangement allows the following logic function (evaluated during phase CK1) to be implemented:

$$CL = +^* (RF_i^* . HIT_i^*)$$

where $+^*$ is the NOR function applied to the set of logical products $RF_i^* . HIT_i^*$, for all values of i. Transistor N3, blocked during phase CK2, contributes to precharging of line CL.

Thus, from the beginning of operation of the associative memory, when all the indicators are initialized at 0, line CL is unloaded at each evaluation phase provided that the saturation condition is not reached. The saturation condition corresponds to the case where all the reference indicators are at 1 except for the indicator that represents a coincidence event. If the saturation condition is reached, line CL retains logic value 1 during the evaluation phase, thereby reporting that the saturation condition is reached.

Synchronization circuit 19D includes an AND gate 21 with three inputs. A first input of the gate 21 receives the latched evaluation signal CL1, a second input receives phase CK2, and the third input receives an authorization-to-operate signal USE. The signal USE is a command signal furnished by the microsoftware of the circuitry 3.

Circuit 19D also has a NAND gate 20 with three inputs receiving, respectively, clock signal CK2, the command signal USE, and a threshold signal $PR_t$ which assumes logic value 1 when the high-speed memory loading threshold is reached. Gate 20 generates a signal $V^*$ which is the complement of the prepositioning signal V that sets to 1. Provided the locations are loaded in a given order, the threshold signal can be obtained simply by reading flip-flop $BPR_t$ whose rank is equal to the value of threshold t and that which was chosen.

Figure 5:
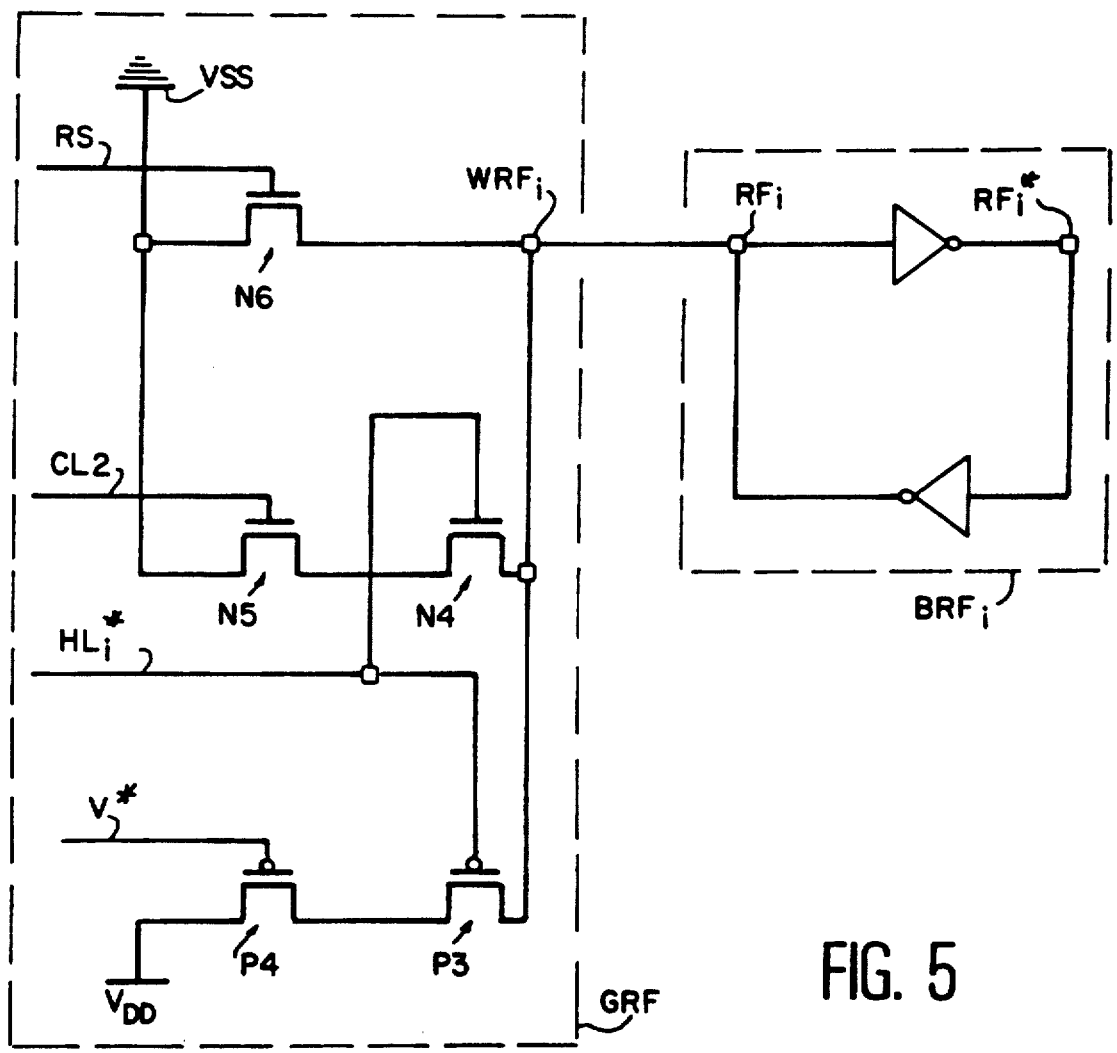
FIG. 5 is a schematic diagram of a management circuit of one of the reference flip-flops.

FIG. 5 represents reference flip-flop $BRF_i$ and its associated management circuit GRF. Flip-flop $BRF_i$ is composed simply of two inverters mounted head-to-tail which furnish reference indicator $RF_i$ and its complement $RF_i^*$. The state $RF_i$ of flip-flop $BRF_i$ is controlled by line $WRF_i$. Line $WRF_i$ can be unloaded via the series arrangement formed of two NMOS transistors N4, N5 or via an NMOS transistor N6. Transistors N4, N5 and N6 receive at their respective gates the $HL_i^*$ signal which is the complement of the $HL_i$ signal, the CL2 signal, and the RS signal. As a result, line $WRF_i$ is unloaded when the RS signal is at 1 or when the CL2 signal is at 1 while the $HL_i$ signal is at 0. Thus, flip-flop $BRF_i$ is forced to 0 when the saturation condition is detected while the virtual address contained in the associated register does not match the virtual address to be translated.

Line $WRF_i$ may be placed at logic value 1 via the series arrangement formed of two PMOS transistors P3, P4 that receive the signals $HL_i^*$ and $V^*$ at their respective gates. As a result of this arrangement, flip-flop $BRF_i$ is forced to 1 when signals V and $HL_i$ are at 1, i.e., when the virtual address sought matches the virtual address contained in the register, provided that the threshold is reached.

Figure 6:
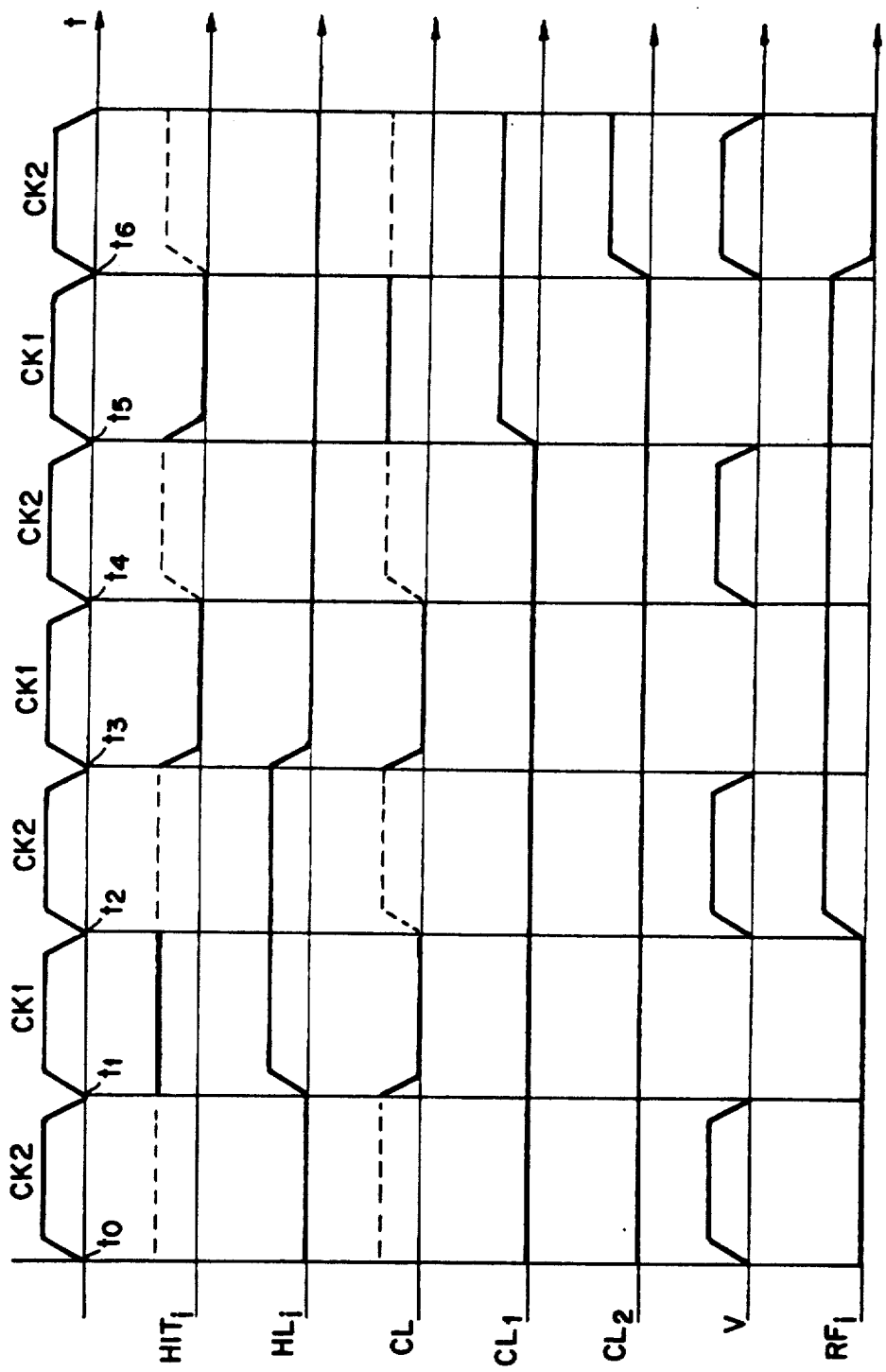
FIG. 6 is a timing diagram illustrating the operation of the circuits shown in FIGS. 3, 4 and 5.

The full operation of the circuits of FIGS. 3, 4 and 5 will now be explained in relation to the timing diagram of FIG. 6. This diagram represents the changes in state over time of the signals CL, CL1, CL2, and V generated by the common control circuit 19B of FIGS. 3 and 4, as well as the signals $HIT_i$, $HL_i$, and $RF_i$ associated with extract i of the associative memory 1 of FIG. 3. It is assumed that extract i is present, i.e., indicator $PR_i$ is at 1. It is also assumed that the threshold has already been reached, i.e., the signal V is at 1 during phase CK2, hence the signal $V^*$ is at 0 during this phase. Finally, it is assumed that at initial time $t_0$, the reference indicator $RF_i$ and the latched evaluation signal CL1 are both at 0.

Precharging of line CL of circuit 19C starts at time $t_0$ during phase CK2. Starting at time $t_1$, during the following phase CK1, coincidence signal $HIT_i$, assumed to have value 1, is evaluated. During this phase, signal $HIT_i$ is held by flip-flop BHL whose state $HL_i$ goes to 1. At the same time, line CL is evaluated. Assuming that saturation is not reached, signal CL goes to 0 and signals CL1 and CL2 also remain at 0. During the next phase CK2, starting at time $t_2$, line CL is once more precharged. Also, with coincidence signal $HL_i$ and validation signal V at 1, transistors P3 and P4 of management circuit GRF conduct, and line $WRF_i$ is charged to a positive voltage, thus forcing indicator $RF_i$ to 1.

During the next phase CK1 after time $t_3$, assuming that there is no match, coincidence signal $HIT_i$ goes to 0 thus forcing signal $HL_i$ to 0. Still assuming that the saturation condition is not reached, line CL is set to 0 during this phase and signals CL1 and CL2 remain at 0. As a result, during the next phase CK2 after time $t_4$, signal CL2 at 0 keeps transistor N5 in a blocked state, thus preventing flip-flop $BRF_i$ from being reset to 0.

During the next phase CK1, after time $t_5$, we have assumed that the threshold condition was reached and signal $HIT_i$ was at 0. As a result, line CL remains high, thereby setting the state CL1 of flip-flop BCL to 1. Thus, during the next phase CK2 after time $t_6$, the prepositioning zero-resetting signal CL2 goes to 1, making transistor N5 conduct. Since signal $HL_i$ is at 0, transistor N4 also conducts and line $WRF_i$ is unloaded and indicator $RF_i$ is reset to 0. The above description shows that the associative memory always operates in accordance with two clock phases, even when the reference indicators must be reset to 0.

Figure 7:
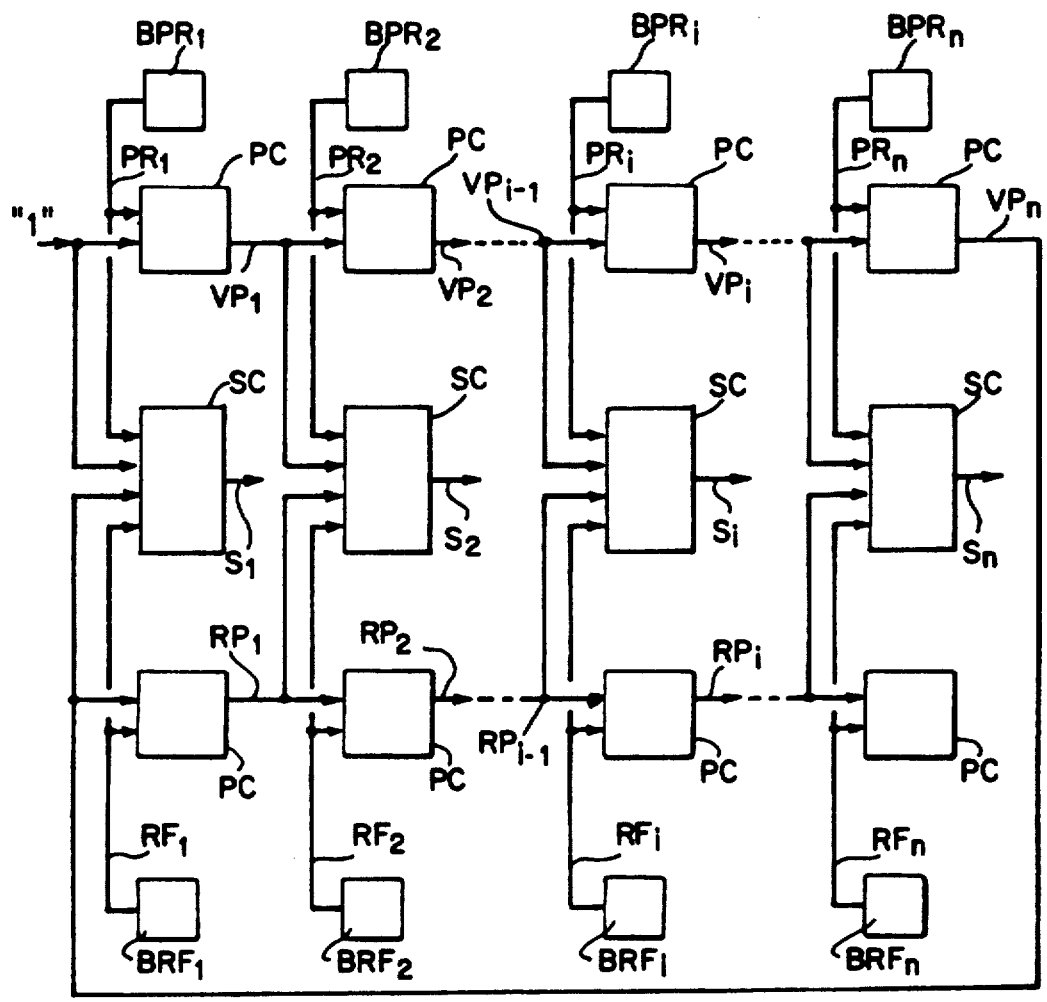
FIG. 7 is a block diagram of a selection circuit for determining the location of the high-speed associative memory into which a new extract is to be loaded.

FIG. 7 represents selection circuit 10 of FIG. 1. We find presence flip-flops $BPR1$, $BPR2$, ..., $BPR_i$, ..., $BPR_n$, and reference flip-flops $BRF1_1$, $BRF_2$, ..., $BRF_i$, ..., $BRF_n$, associated respectively with extracts of rank 1, 2, ..., i, ..., n from the associative memory. Each extract i has associated with it a selection cell SC and two propagation circuits PC that propagate a request signal, associated respectively with extract presence and reference flip-flops. Each propagation circuit PC furnishes a request signal $VP_i$ or $RP_i$, and receives indicator $PR_i$ or $RF_i$, of the associated flip-flop, as well as request signal $VP_{i-1}$ or $RP_{i-1}$ from the upstream propagation circuit.

Output $VP_n$ of propagation circuit PC associated with presence flip-flop $BPR_n$ of the last extract of rank n is applied to the request input of the propagation circuit associated with reference flip-flop $BRF_i$ of the first extract. In addition, the request input of propagation circuit PC associated with presence flip-flop $BPR_1$ of the first extract continuously receives a signal representing the existence of a request. In the example shown, we assumed that a request was present when the associated request signal was at 1. Alternatively, the reverse convention could be chosen without thereby departing from the framework of the invention.

Each propagation circuit is designed to deliver a request signal $VP_i$, or $RP_i$, that represents the existence of a request when the upstream request signal $VP_{i-1}$ or $RP_{i-1}$ indicates the existence of a request while indicator $PR_i$ or $RF_i$ is at 1. Moreover, selection cell SC furnishes a selection signal $S_i$ representing the selection of an extract i when one of the upstream request signals $VP_{i-1}$ or $RP_{i-1}$ reports the existence of a request when the associated flip-flop $BPR_i$ or $BRF_i$ is at 0.

The circuit in FIG. 7 operates as follows. As a function of the state of the presence and reference flip-flops, the request signal permanently applied to the input of the propagation circuit associated with first presence flip-flop BPR1 propagates stepwise, in increasing extract order, via propagation circuits associated first with the presence flip-flops, then via propagation circuits associated with the reference flip-flops. Propagation of the request signal stops at the propagation circuit that is associated with a presence flip-flop or reference flip-flop which is at 0. The selection cell associated with this extract then places selection signal $S_i$ at a specific logic value, indicating that a new extract must be written in the associated registers.

Thus, the circuit of FIG. 7 always allows the location of the associative memory that is to receive a new extract to be pinpointed. The loading algorithm employed by this circuit thus consists of searching, in ascending order according to the ranks assigned to the locations, the first location containing no extract (the first whose presence indicator $PR_i$ is set at 0), then the second extract which has not been used recently (the first whose reference indicator $RF_i$ is set at 0). According to this arrangement, updating of selection signals $S_i$ is automatically controlled by the change in state of the presence and reference flip-flops.

Due to the cascade arrangement of a propagation circuit, its reaction time is fairly long. Fortunately, the selection signals are not utilized until after the search in the tables for a new extract to be loaded, which is also a fairly lengthy operation. However, the slowness of the selection circuit may become cumbersome if the associative memory has a large number of extracts. Thus, to overcome this slowness, and according to one advantageous embodiment of the invention, optimization of the selection cells and propagation circuits is employed to reduce the number of layers of these circuits, thereby increasing operating speed. Accordingly, two different types of cells are provided, each type respectively associated with either odd or even rank locations.

Figure 8:
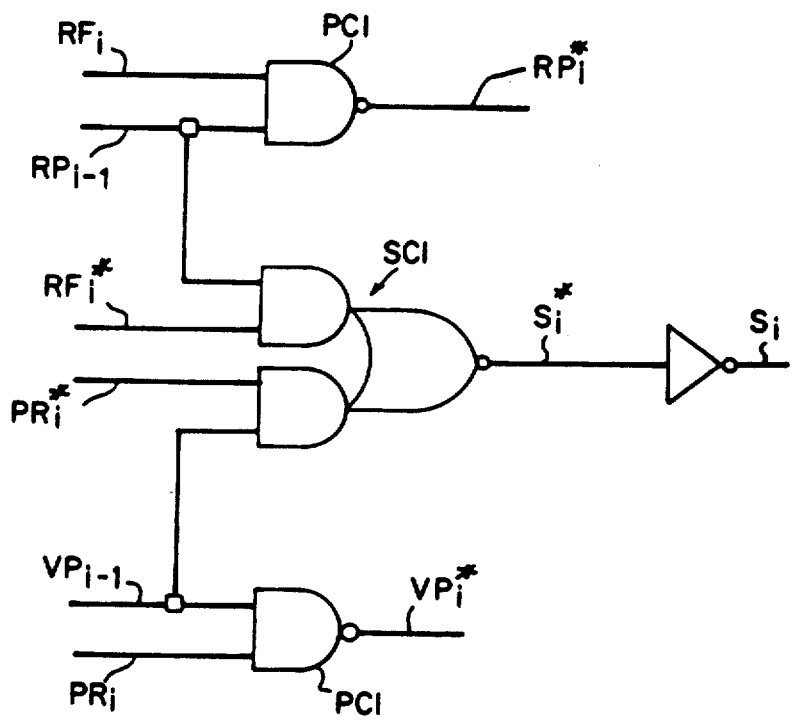
FIGS. 8 and 9 are schematic diagrams of the implementation details of the circuit of FIG. 7.

FIG. 8 shows selection cell SCI and propagation circuits PCI associated with an odd-ranked location. Propagation circuits PCI each consist of a NAND gate receiving, at a first input, associated indicator $RF_i$, $PR_i$ and at a second input, upstream request signal $RP_{i-1}$, $VP_{i-1}$. The PCI gates deliver at their outputs the request signal complements $RP_i^*$, $VP_i^*$. The SCI cell is a complex logic gate which receives at the input the upstream request signals $RP_{i-1}$, $VP_{i-1}$ and complements $RF_i^*$, $PR_i^*$ of indicators $RF_i$, $PR_i$. The SCI gate implements the equation:

$$S_i^* = (RF_i^* \cdot RP_{i-1} + PR_i^* \cdot VP_{i-1})^*$$

To obtain signal $S_i$, the output $S_i^*$ of the SCI gate is connected to an inverter.

Figure 9:
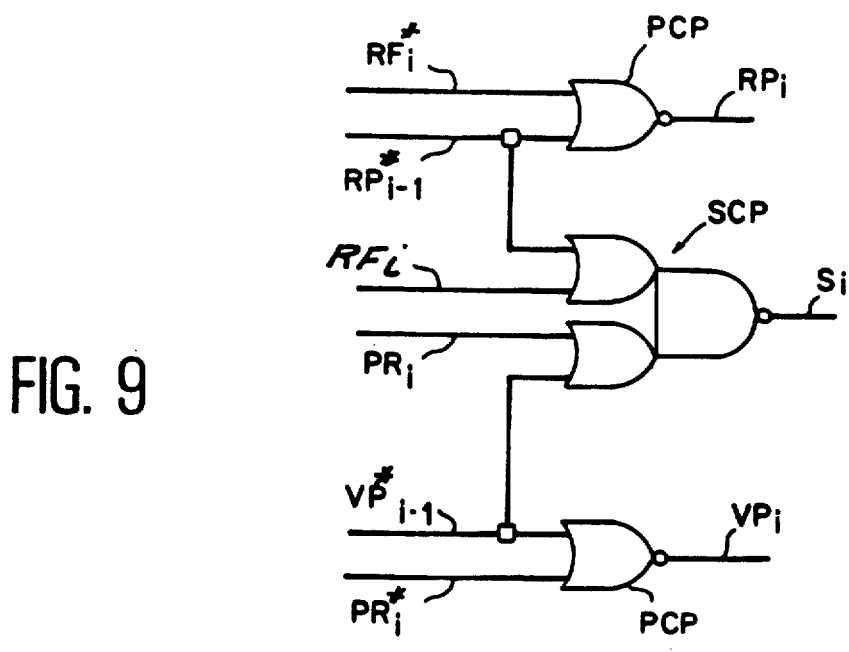

FIG. 9 shows a selection cell SCP and propagation circuits PCP associated with an even-ranked location. The propagation cells PCP are implemented by NOR gates that receive, at a first input, the complement of associated indicator $RF_i$, $PR_i$ and at a second input, the complement $RP_{i-1}^*$, $VP_{i-1}^*$ of request signal $RP_{i-1}$, $VP_{i-1}$ coming from the preceding odd stage. Selection cell SCP is a complex gate receiving at its input indicators $RF_i$, $PR_i$ and complements of associated request signals $RP_{i-1}$, $VP_{i-1}$. The SCP gate delivers selection signal $S_i$ verifying the preceding logical equation. Cells SCI, SCP, and gates SCI, PCP can easily implemented in CMOS technology.

Figure 10:
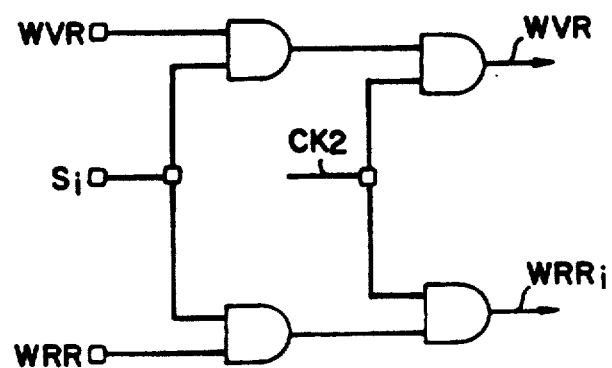
FIG. 10 is a schematic diagram of a control circuit for loading one of the locations of the high-speed associative memory.

Finally, FIG. 10 represents the circuit for generating write command signals $WVR_i$ and $WRR_i$ associated with registers $VAR_i$ and $RAR_i$ respectively as a function of control signals WVR, WRR and selection signal $S_i$. The circuit in FIG. 10 is made with AND logic gates allowing transmission of common signals for controlling the writing of virtual address WVR or real address WRR, validated by selection signal $S_i$ and synchronized by clock phase CK2.

Other modifications and implementations will occur to those skilled in the art without departing from the spirit and the scope of the invention as claimed. Accordingly, the above description is not intended to limit the invention except as indicated in the following claims.

What is claimed is:

1. A method for accessing information contained in a main memory of a computer system, wherein said system includes a high-speed associative memory with a plurality of memory locations, each memory location being capable of storing an "extract", each extract including an address and an associated information component, each memory location being associated with a presence indicator and a reference indicator, each indicator being initialized to a first logic state, said method comprising the steps of:

determining the address of a desired information component;

forcing the presence indicator of a memory location into a second logic state when said extract is loaded into said memory location;

accessing said information component by associatively searching within said high-speed associative memory for an extract with an address that matches the address of said information component;

replacing an old extract selected by a selection algorithm with a new extract if said extract is not found in a memory location within the high-speed associative memory; and upon use of an extract, maintaining said reference indicator associated with said memory location that contains said extract in said first logic state if a number of extracts stored in said associative memory is less than a given threshold value, the threshold value being less than a maximum capacity value of said associative memory or forcing said reference indicator into a second logic state if the number of extracts stored in said associative memory is at least equal to said threshold value.

2. The method according to claim 1 wherein:

a rank is assigned to each memory location in said associative memory;

extracts are initially loaded into memory locations of increasing rank in chronological order; and a state of the presence indicator whose rank is equal to said threshold value provides an indication that said threshold value has been reached.

3. The method according to claim 1 or 2 wherein:

if the information component sought is not found in the associative memory, said information component is sought in the main memory;

the extract associated with said information component is loaded into the high-speed associative memory at a location whose rank is determined by said selection algorithm;

the associated presence indicator is forced into said second logic state substantially contemporaneously with said loading; and a new associative search for the sought information is then performed.

4. The method of claim 3 wherein said selection algorithm includes the steps of:

searching, in order of increasing rank, for the first extract whose presence indicator is in said first logic state, or failing that, for the first extract whose reference indicator is in said first logic state.

5. The method of claim 1 wherein said computer system includes a paginated virtual memory mechanism, said address of each extract being a virtual page address and said information component being a real page address.

6. The method of claim 1 wherein said main memory is organized in pages, said address of each extract is a real page address, and said information component includes data contained in said page.

7. A computer system comprising:

a main memory;

processing means for accessing said main memory by addressing, wherein an "extract" includes an address and an associated information component, and wherein said processing means includes:

a high-speed associative memory comprising:

a plurality of memory locations for storing a plurality of respective extracts, wherein each memory location is associated with a presence flip-flop and a reference flip-flop, said flip-flops being initially set to a first logic state, said presence flip-flop subsequently being set to a second logic state when an extract is loaded into said memory location;

comparison means, cooperative with said high-speed memory, for providing each memory location with a coincidence signal having a first logic value when the address of an item of sought information matches the address of the extract present in said memory location;

said computer system further comprising:

threshold detection means for furnishing a threshold signal whose logic value indicates whether the number of extracts present in said high-speed associative memory is at least equal to a given threshold value; and for each extract that is present, a management circuit wherein the associated reference flip-flop is forced into a second logic state when said coincidence signal indicates a match while said threshold signal indicates that the threshold has been reached.

8. The computer system of claim 7 wherein:

to select a memory location in which an extract not yet present in said high-speed associative memory will be loaded, each presence flip-flop and each reference flip-flop is associated with a propagation circuit that provides a request signal;

a rank is assigned to each memory location so that propagation circuits associated with each presence flip-flop and each reference flip-flop respectively are arranged in cascades;

an output of the propagation circuit associated with a last presence flip-flop is connected to an input of a propagation circuit associated with a first reference flip-flop;

each propagation circuit delivers a signal that indicates that a request exists only if an upstream request signal indicates that a request exists and the associated flip-flop is in said second given logic state;

the propagation circuit associated with a first presence flip-flop continually receives a signal representing the existence of a request; and each location is associated with a selection circuit for delivering a signal representative of selection of said location when the upstream request signal associated with one of the flip-flops of said location indicates that a request exists while said flip-flop is in a first given state.

9. The computer system of claim 8 wherein said threshold detection means receives a state signal provided by a presence flip-flop associated with a location whose rank is equal to a predetermined threshold value.

10. The computer system of claim 7 further comprising:

a paginated virtual memory mechanism wherein:

said address of each extract is a virtual address;

said associated information component is a real address; and each memory location of said high-speed associative memory includes a virtual address register and a real address register.

* * * * *

UNITED STATES PATENT AND TRADEMARK OFFICE
CERTIFICATE OF CORRECTION

PATENT NO. : 5,218,687
DATED : June 8, 1993
INVENTOR(S) : Laurent Ducousso

It is certified that error appears in the above-indentified patent and that said Letters Patent is hereby corrected as shown below:

Column 11, line 19, "BPR1" should read --$BPR_1$--.

Signed and Sealed this

Seventh Day of June, 1994

BRUCE LEHMAN

Attest:

Attesting Officer

Commissioner of Patents and Trademarks